Dec. 4, 1951      H. E. STRATTON      2,577,545
WIRE SAW APPARATUS Filed April 2, 1949      8 Sheets-Sheet 1

Dec. 4, 1951        H. E. STRATTON        2,577,545
WIRE SAW APPARATUS

Filed April 2, 1949                           8 Sheets-Sheet 2

Dec. 4, 1951  H. E. STRATTON  2,577,545
WIRE SAW APPARATUS
Filed April 2, 1949  8 Sheets-Sheet 3

Inventor:
Harry E. Stratton
Munro W. Hamilton
by Attorney

Dec. 4, 1951         H. E. STRATTON         2,577,545
WIRE SAW APPARATUS
Filed April 2, 1949                           8 Sheets-Sheet 7

Dec. 4, 1951  H. E. STRATTON  2,577,545
WIRE SAW APPARATUS
Filed April 2, 1949  8 Sheets-Sheet 8

Inventors:
Harry E. Stratton
Munroe W. Hamilton
by
Attorney

Patented Dec. 4, 1951

2,577,545

UNITED STATES PATENT OFFICE 2,577,545

WIRE SAW APPARATUS

Harry E. Stratton, Chelmsford, Mass., assignor to H. E. Fletcher Company, West Chelmsford, Mass., a corporation of Massachusetts Application April 2, 1949, Serial No. 85,173

3 Claims. (Cl. 125—21)

This invention relates to an improved wire saw apparatus of the type employed in quarrying operations in which an endless wire saw member is utilized to drag a finely divided abrasive material into sliding contact with a rock surface to be sawn. A preferred embodiment of the invention is exemplified by an apparatus which includes means for furnishing and handling a plurality of wire saw elements arranged in close proximity to one another and operating simultaneously to provide a series of kerfs in a bench or block of stone. Although the invention is described herein as applied to a quarry operation, it is also applicable in a stone processing plant where the stone is brought from the quarry for further finishing as well as in various other operations.

It is in general an object of the invention to improve wire sawing methods and equipment and to devise more efficient and cheaper sawing operations which will increase quarry output, reduce the time and labor involved and prevent waste of stone. Another object is to provide improved means for furnishing a driven wire whose length and tension characteristics are automatically varied in accordance with the demands of sawing sheaves.

It is a further object of the invention to deal with the problems encountered in leading off and guiding wire saw elements from a wire furnishing tower or column to varying locations where a sawing operation is desired to be carried out. With conventional forms of sheave members such as used in wire saw apparatus, there is a lack of flexibility in readily leading off the wire in varying directions. Trouble may also develop from the wires being drawn off at an untrue angle or from the wires falling away from one or more of the sheave members for example at such times as there occurs a drop in tension, or an interruption of the sawing process or in various other ways.

The wire saw apparatus of the invention is designed to achieve the foregoing objectives and to greatly minimize the problem indicated by combining with special wire handling equipment a series of orienting or guide sheaves arranged to rotate in different planes of rotation so chosen that a wire which is moving in a substantially straight line may at one point be lead off in any desired direction. These sheaves function to guide the wire member in a novel manner such that the wire will at all times leave the sheave members in a true manner. The sheaves further cooperate with one another to support the wire so that there is little opportunity for the wire members to fall away from the sheave members if a change in tension occurs.

These and other objects and novel features will be more fully understood and appreciated from the following description of a preferred embodiment of the invention, chosen for purposes of illustration and shown in the accompanying drawings, in which.

Figures 1, 2:
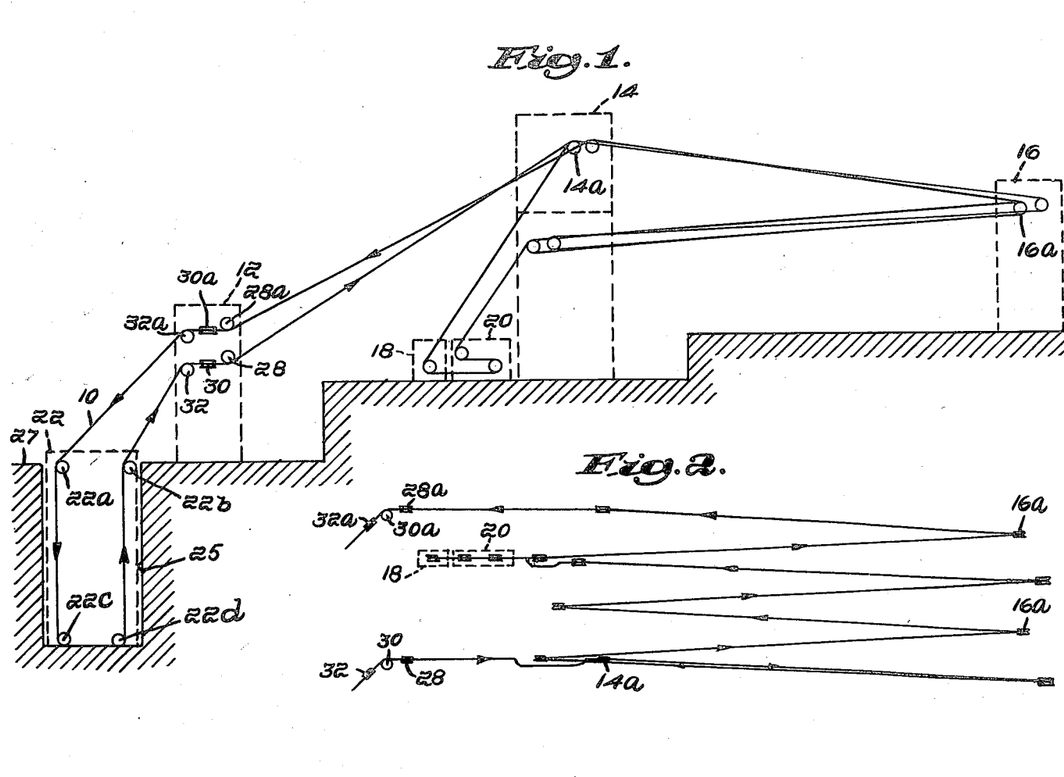
Fig. 1 is a view in side elevation illustrating disgrammatically a section of a quarry and the wire sawing apparatus of the invention located in one typical operating position.
Fig. 2 is a plan view further illustrating parts of the wire sawing apparatus in an operating position and indicating diagrammatically the method of reeving the wire saw element.

In Figs. 1 and 2 of the drawings there has been indicated diagrammatically a typical reeving plan for an endless wire saw element employed for example in cutting or sawing relatively hard mineral bodies such as granite as found in granite quarries of the open pit type. Such an open pit quarry may include a considerable area and extend into the earth for a depth of from one to several hundred feet. Whether the equipment is utilized entirely within the quarry or lead in from a point outside the quarry, there is necessarily involved an apparatus of considerable magnitude and especially so with respect to the sawing wire, which is required to have a substantial reach.

Then too in actual practice, sawing of the relatively harder stones such as granite may result in greatly increased wear of the wire saw element. To reduce such wear, as well as furnish adequate range therefor, it is helpful to utilize greatly increased lengths of saw wire. Thus as an instance of suitable saw dimensions applied successfully in one open pit quarrying operation, there may be employed saw lengths running from 10,000 feet or less all the way up to 20,000 feet or more. A gang of these saws in the lengths indicated, and including as many as six or more, may be operated simultaneously, running in parallel spaced-apart relation to one another. It will be understood that extensive wire supporting towers and sheaves are desirable in receiving as well as furnishing and guiding these relatively great lengths of wire to varying points of sawing in response to demand of the sawing sheaves. In the specific apparatus referred to, a series of these towers are arranged in line with one another in a direction extending away from the quarry for a distance of approximately 1500 feet, with the towers in each instance having a height of from 50 to 100 feet and a width of roughly 40 to 60 feet. Each tower is provided with multiple sheave means along which the series of wire saws may be driven under a tension of about 300 lbs. at speeds of from 3,000 to 4,000 feet per minute for example.

Thus the sawing apparatus illustrated in Figs. 1 and 2 in general may be considered as being made up of three parts comprising the endless wire elements, a number of sets of sawing sheaves for urging the wires into sliding contact with a granite or other rock surface and wire furnishing means for delivering wires in suitable lengths in response to demand of respective sets of sawing sheaves. The wire furnishing means may include the wire supporting and guiding towers; power means for driving the wire preferably located outside the quarry in close proximity to one of the towers; mechanism associated with the power means for varying the lengths of the wire; and an automatically adjustable tensioning apparatus connected to the mechanism for varying the length of wire used.

Figure 2A:
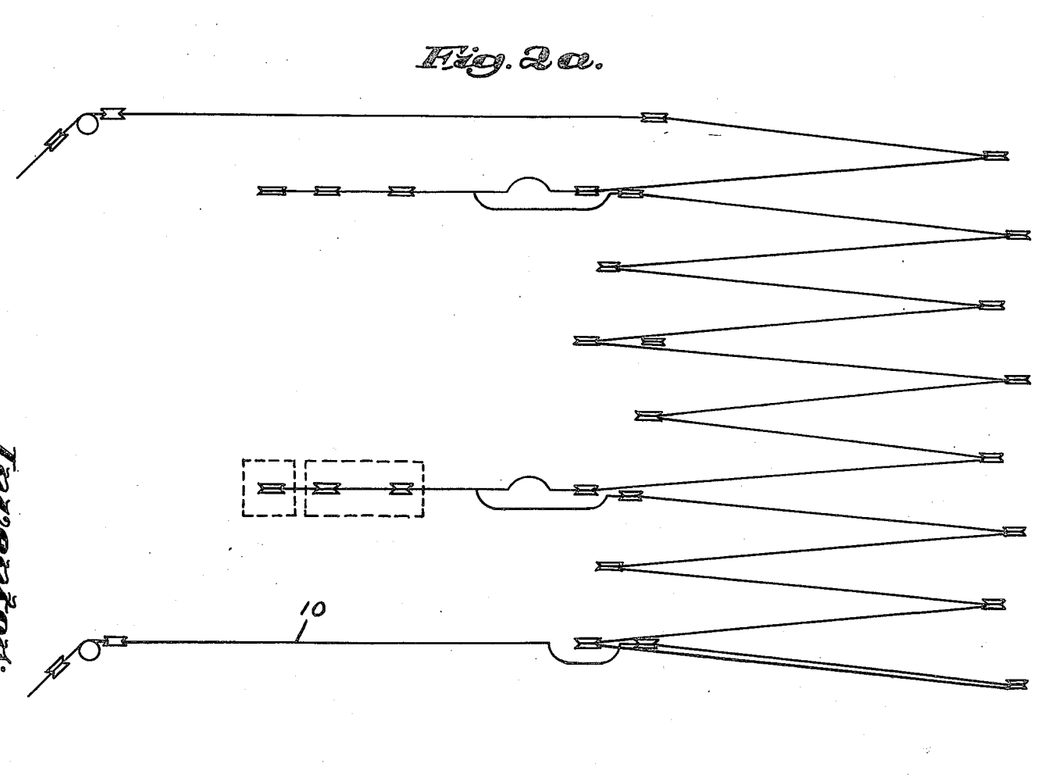
Fig. 2a illustrates another reeving diagram for a wire saw.

In the structure shown in Fig. 1, numeral 10 denotes an endless wire saw member representative of several of such wires which are preferably employed in the apparatus of the invention. One desirable reeving arrangement for the wire 10 has been suggested in Fig. 2. A second reeving arrangement for a greater length of wire is shown in Fig. 2a. As noted in these figures, saw member 10 is shown supported in a raised position by means of the wire furnishing means including for example the three wire supporting structures or towers 12, 14 and 16 which may in each instance consist of a metal framework bolted together and mounted at spaced-apart intervals near the edge of the quarry as noted in Fig. 1. As noted by arrows, the wire member 10 passes over guide sheaves 16a of tower 16, guide sheaves 14a of tower 14 and two sets of orienting sheaves in tower 12. As shown diagrammatically in Fig. 1, the two sets lie one above another of which a lower set of sheaves 28, 30 and 32 receive incoming portions of wire 10, and an upper set of sheaves 28a, 30a and 32a carrying outgoing portions of wire 10.

Preferably the three towers 12, 14 and 16 are arranged in substantial alinement with one another so that the wire 10 is guided along planes which deviate only slightly from the planes of rotation of the sheaves and the wire is thereby lead away from the sheaves in true directions. The wire 10 is driven by a power unit 18 preferably mounted outside the quarry pit between tower 12 and tower 14, and beside this unit is located a mechanism 20 for varying the length of wire in operation at any given time in response to the demand of the sawing sheave mechanism 22 indicated at the lower left-hand side of Fig. 1. Included in the mechanism 22 is a set of four sheaves 22a, 22b, 22c and 22d. Sheaves 22c and 22d are vertically adjustable by means of a hoist mechanism shown at another point in the drawings and referred to hereinafter in the specification. Sheaves 22a and 22b are preferably mounted in fixed sawing towers which are in turn supported in core drill holes 23 and 25 formed in a body of rock 27 as suggested in Fig. 3a. In the latter figure there are also shown with sawing sheaves 22a and 22b, uppermost sheaves of respective sets of sheaves for additional wire members 10a, 10b, 10c, 10d and 10e.

Figure 3:
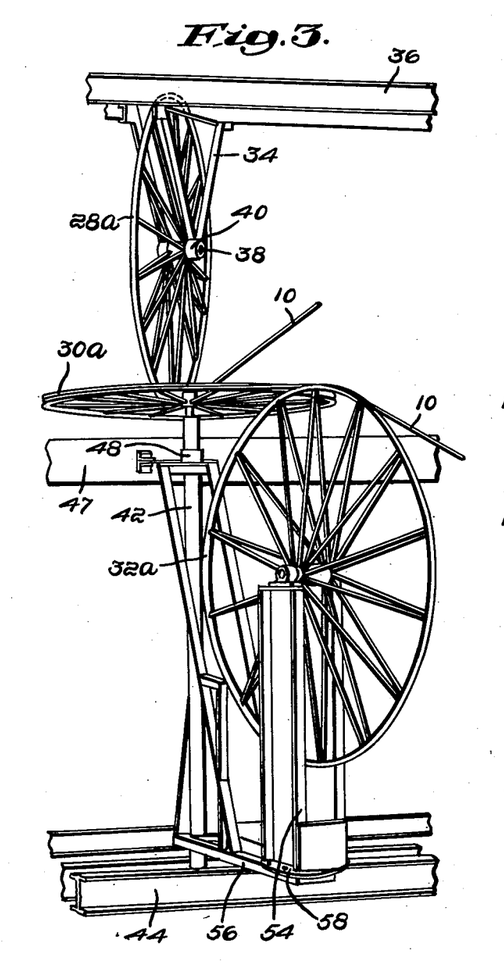
Fig. 3 is a fragmentary perspective view more fully disclosing the multiple sheave mechanism of the invention.
Figure 3A:
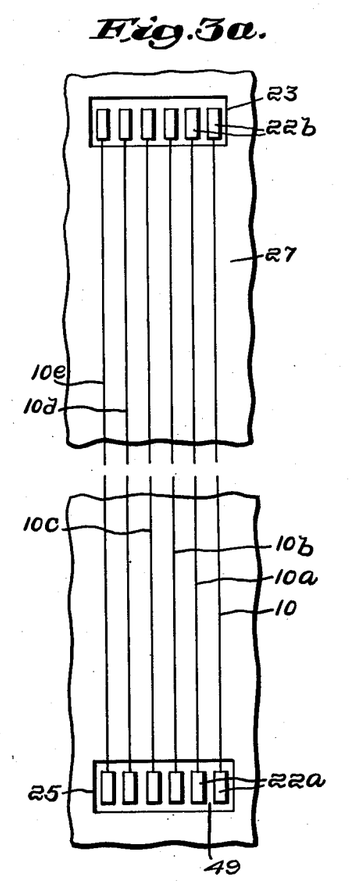
Fig. 3a is a detail plan view of a gang of sawing sheaves mounted in an operating position in a section of granite to be sawn.
Figure 4:
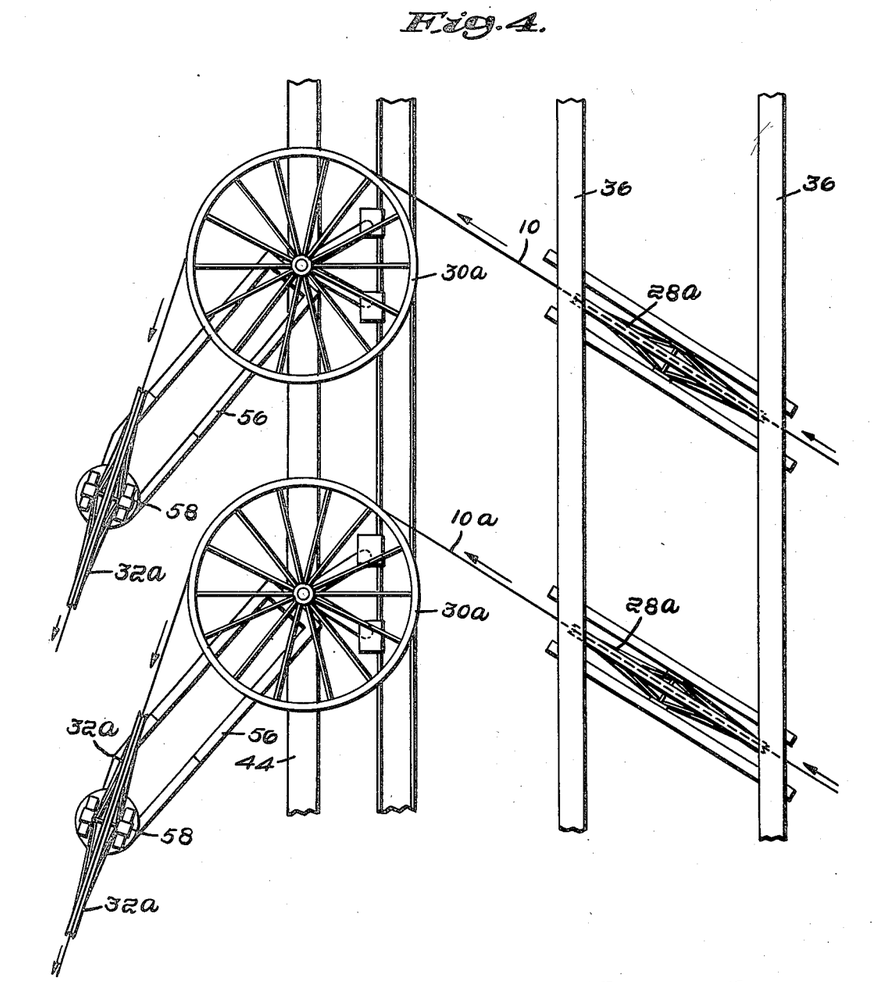
Fig. 4 is a fragmentary plan view further illustrating the sheave mechanism indicated in Fig. 3.
Figure 5:
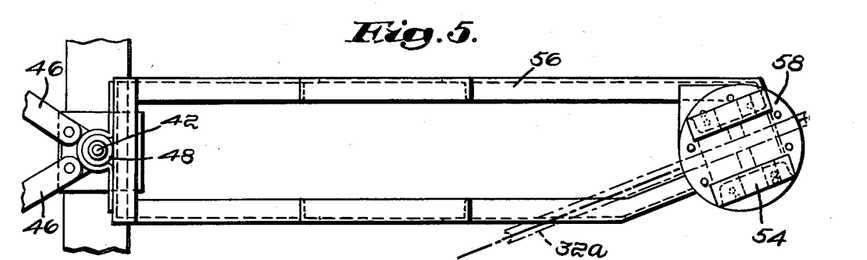
Fig. 5 is a detail plan view of bracket means for supporting a sheave member.
Figure 6:
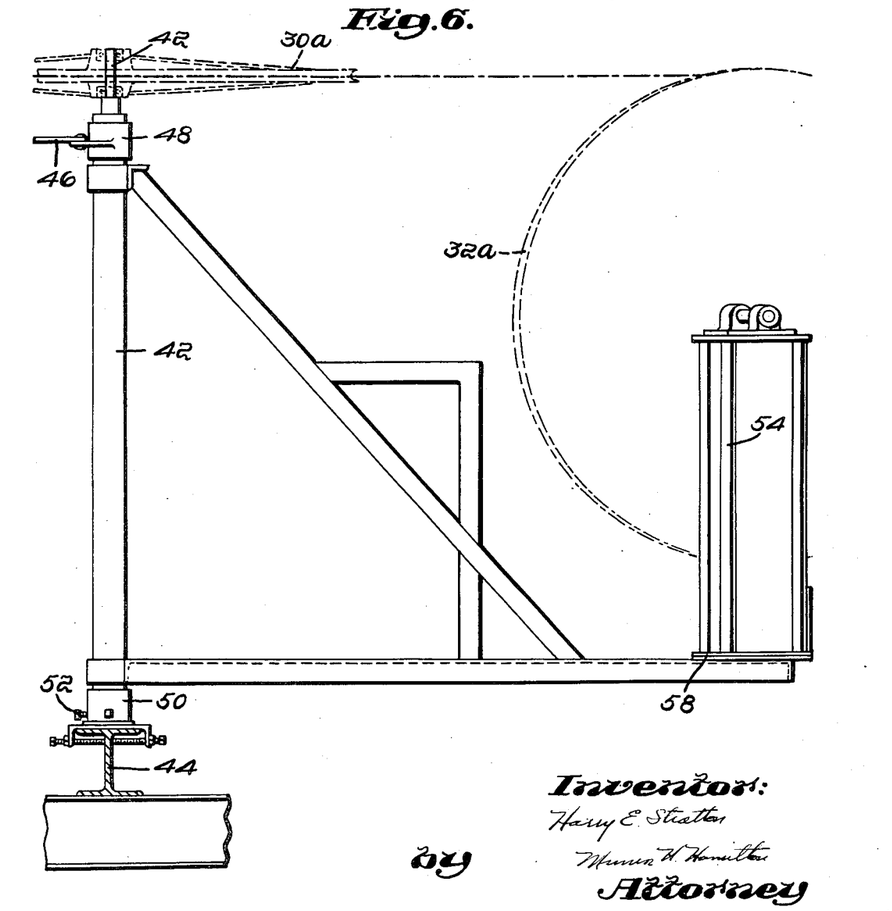
Fig. 6 is a detail elevational view of the bracket member shown in Fig. 5.
Figure 12:
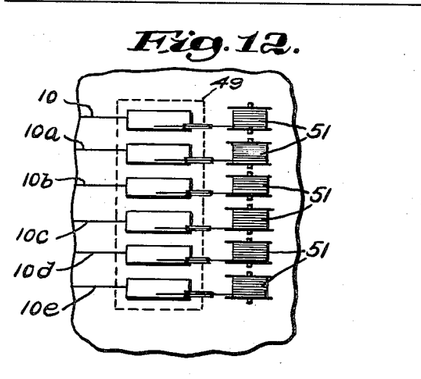
Figure 13:
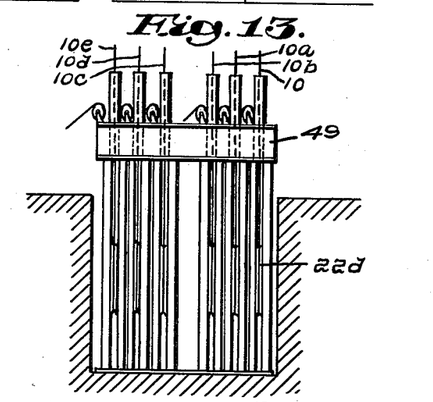

The sheaves of tower 12 together with portions of the superstructure of this tower have been illustrated in greater detail in Figs. 3–7 inclusive. Fig. 4 shows saws 10 and 10a which a number of other saws such as 10c, 10d and 10e are indicated in Figs. 3a, 12 and 13. Each of these saws is provided with sheave mechanisms shown in Figs. 3 and 4 and such an arrangement provides for a multiple wire sawing operation and constitutes a preferred mode of applying the apparatus of the invention.

Considering in greater detail the structures illustrated in Figs. 3 and 4, the outgoing portions of the endless wire 10 are guided and directed by the upper set of orienting sheaves 28a, 30a and 32a, of which sheave 28a is mounted for rotation in a vertical plane and suspended from a pair of downwardly extending arms 34 in turn supported by horizontal rail members 36 of the tower 12. The arms 34 may for example support the sheave 28a by means of annular bearings 38 through which extends a shaft 40. The arrangement of sheave 28a in tower 12 may be more clearly seen from an inspection of Figs. 4 and 7 in which additional details of the tower structure are disclosed. It is contemplated that the arms 34 may be slidably adjusted along the rails 36 to any desired point and at the same time the arms may be rotated about a vertical axis and swung into varying positions of angularity with respect to the rails 36.

Located below and in front of the sheave 28a is the second sheave member 30a which is mounted for rotation in a horizontal plane at the top of a vertical post 42, in turn pivotally mounted on a rail 44 and braced by transverse bars 46. The bar is fast to a member 47 and at its outer end is provided with a sleeve 48 through which the post extends. A similar sleeve 50 is located on rail 44 and encircles the bottom of the post 42 and includes a set screw 52 by means of which the post may be fixed in any desired position into which the post is turned in the sleeves 48 and 50.

Located below and in front of the sheave 30a is the third sheave member 32a mounted for rotation in a vertical plane and secured between two upright members 54 supported at the end of a bracket 56 which is fixed to the post 42 and swung with this member about a vertical axis passing through the center of the sheave 30a. The upright members 54 are further provided with means for orienting sheave member 32a about a vertical axis. Such means for example include a circular plate 58 on which members 54 are mounted and having adjustment screws for holding the plate in a suitable position on the bracket 56.

In assembling the set of orienting sheaves in tower 12, the position of the three sheaves relative to one another is so chosen, either by varying the length or height of the supporting members or in some other way, as to cause the sheave 30a to lie in a horizontal plane of rotation which is tangent to the lowermost point on the periphery of the upper sheave 28a; and also tangent to the uppermost point on the rim of the sheave 32a. In this relative position the sheave 28a may be oriented so as to rotate in a vertical plane of rotation which is tangent to the periphery of sheave 30a, and fixed in this position. Similarly the sheave 32a may be oriented about a vertical axis by the adjustment means noted and likewise held in a vertical plane of rotation which is tangent to the periphery of the sheave 30a at another point. It will be noted that with sheave 32a fixed in the tangential relationship described by means of plate 58, the sheave and its supporting bracket 56 may be swung through a considerable arc and in all positions the sheave 32a will move into vertical planes of rotation, any one of which is tangent to the periphery of sheave 30a. This arrangement makes it possible to select any desired plane of rotation corresponding to the direction in which the sheave and wire are to be led off and then hold the sheave in this position by means of the set screw 52 in collar 50 acting on post 42. Likewise a very quick change may be carried out with little loss of time when the position of the sawing sheaves is changed in the quarry.

With the orienting sheaves thus arranged in series in such a way as to cause the sheaves to be in successively different planes of rotation, the wire 10 may be led into the tower at almost any desired angle to the rails 36 and received by the sheave 28a. The wire then is led around the periphery of the intermediate horizontal sheave 30a until it is in a position of tangency with respect to the lower sheave 32a, thus achieving a horizontal change in direction of the wire without developing any tendency for the wire to leave either sheave 28a or sheave 30a at an untrue angle. Thereafter the wire 10 passes out of the tower 12 over the sheave 32a and again the direction of the wire is changed in a vertical plane without the wires leaving the sheave 32a at an untrue angle.

A second important function of the series of orienting sheaves described is a supporting of the wire 10 so that it is prevented from falling away from any one of the sheaves. Considering each of the sheaves from this point of view, it will be seen that they are located fairly close to one another and wire 10 led from a point above sheaves 28a will pass down under this member and will be held by the engagement of the wire in the horizontally disposed sheave 30 even if tension in the wire is relaxed. In the case of the horizontal sheave, the wire is prevented from falling away with drop in tension since the weight of the wire occurring as it does below sheave 30a will tend to keep the wire in alinement with the groove of sheave 30a.

The sheave arrangement is characterized also by desirable flexibility features which make it possible to direct one or more saws over a relatively wide range of operating area. Thus in the arrangement shown in the drawings, the sheave 32a may be swung through an arc of roughly 90° with little trouble. If desired however a much greater range may be included as an arc of 180° may be obtained by changing the position relationship between sheave 28a and 30a so that the wire passes around the opposite side of sheave 30a; and also by changing the relationship between sheaves 30a and 32a by rotating sheave 32a about a vertical axis by means of adjustment of plate 58 until sheave 32a is in a vertical plane which is tangent to the opposite side of sheave 30a. It will also be understood that the wire may be so directed as to pass over the sheave 28a if led in from a point below the tower deck, it only being necessary to change the position of supporting bracket for sheave 28a so that the top of sheave 28a will fall in horizontal plane of sheave 30a.

All of the foregoing adjustment may be made with respect to the second set of sheaves 28, 30 and 32 located on the lower deck of the tower 12 to receive the wire as it releases from the sawing sheaves. Likewise it should be understood that adjustment of both upper and lower sets of orienting sheaves will be carried out for each of the respective wires 10a, 10b, 10c, 10d and 10e indicated as passing over the several sets of sawing sheaves shown in Fig. 3a.

Figures 9, 10:
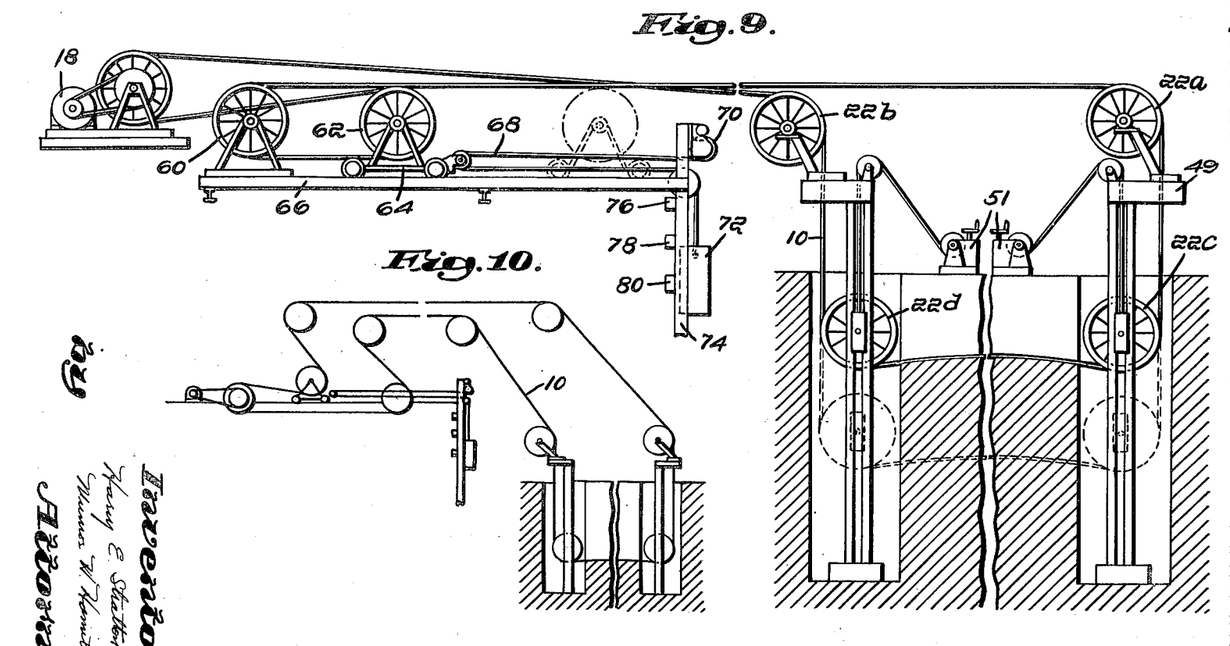
Fig. 9 is an elevational view illustrating diagrammatically driving and tensioning means arranged to operate a wire member and including sawing sheaves shown mounted in core drill holes.
Figs. 10-13 inclusive illustrate modifications of the tensioning and sawing apparatus.

These several sets of sawing sheaves are further illustrated diagrammatically in Figs. 9, 10, 12 and 13, together with a showing of a part of the supporting frame structure 49 and winches 51 arranged in position to raise and lower the bottom sheaves of each respective set. The winches 51 lower the sheaves as they progress downwardly with the cut of the saw element 10 in the granite. In actual practice these cuts may be of a length of from 20 feet to 60 or 70 feet or more, and a depth of from four to five feet up to twenty-five or thirty feet or more. There is in this way formed a stand of rock slabs which by well known quarrying methods are separated and carried out of the quarry for further processing. In some cases it is important in forming the slabs to operate the saws simultaneously and to guide the cut along substantially parallel lines. In such cases it is essential that the orienting guide sheave mechanism work in conjunction with the several sets of sawing sheaves and the multiple wires to keep them running smoothly and in proper alinement. Fig. 10 shows a sheave arrangement somewhat similar to Fig. 9 but indicating the wire in a raised position with respect to the driving and tensioning mechanism.

The cooperative action of my sheave mechanism in maintaining the wire in proper alinement when a change in the length of wire occurs, may be better understood from a consideration of the apparatus shown in Fig. 9, in which the sawing equipment has been indicated diagrammatically. In the structure shown, adjustable sawing sheaves 22c and 22d are shown in an intermediate position into which they have been lowered by winches 51. The dotted line showing indicates the position into which the saw and sheaves will move as sawing progresses. Increase in the length of the wire 10 is controlled by sheave 60 and movable sheave 62 around which wire 10 passes. The movable sheave is mounted on a travelling car 64 arranged to move back and forth on tracks in flat base 66. The travelling member 64 is fastened to a cable 68 which is wound around a drum 70 and has an end attached to a weight 72 slidably disposed in a vertical frame 74. Along the sides of the frame are mounted a number of limit switches 76, 78 and 80, having operating arms lying in the path of movement of the weight 72.

In operation the sawing sheaves 22c and 22d are lowered as sawing progresses, it being understood that the wire is sawing at full speed. In response to demand of the sawing sheaves, wire is furnished by the travelling car 64 moving along the tracks from the dotted line position shown in Fig. 9 to the full line position noted. In moving into its new position the car raises the weight 72. The latter member in turn rises until it trips one of the limit switches 76 which is the "pay out" switch. This switch actuates the electric winch 70 causing the rope to pay out and lower the weight again. At some point in its downward movement, the weight trips the stop switch which stops further paying out. It may be that the sawyer wishes to raise the sawing sheaves as he naturally would at the end of the cutting. In such case the sawyer releases an excess of wire from the sawing tower and this permits the car to move backward and the weight to drop. Here the weight goes down and hits the bottom "pull in" switch, causing the winch to pull the rope. Pulling continues until the weight rises to the middle switch which again turns off the electric winch. It will be observed that with this arrangement there is obtained a great deal of take-up in the travelling car with only a limited travel space utilized for the weight to move. It will also be apparent that a considerable change in the amount of wire required in a system takes place from time to time, not only during set-up operations but also during sawing operations, and that this arrangement provides for it without materially changing the amount of tension in the wire.

Figure 11:
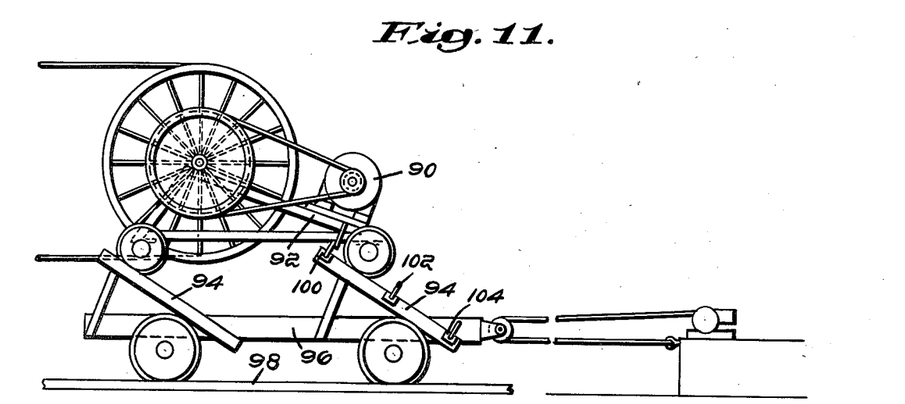

Another arrangement for varying the length of wire furnished has been illustrated in Fig. 11. In this structure the power drive 90 is mounted on a car 92 which is movably supported on inclined tracks 94. The inclined tracks are in turn disposed on another car 96 slidably received on an approximately horizontally arranged track 98. Limit switches are placed at points 100, 102, 104, along the side of the track 94. In the operation of this device, as the sawyer pulls in or pays out wire at the sawing tower, the upper inclined car rides up or down on its track. The limit switches are contacted by an actuating lever mounted on the car and operate the power. This causes the bottom car on the horizontal track to follow the upper car so that the sawyer has a large range of available wire for his sawing. As was the case before, the orienting sheaves operate to keep the wire running properly and thus cooperate with the above-noted tension mechanism to provide for a carefully controlled and guided sawing operation of novel character.

Figures 7, 8:
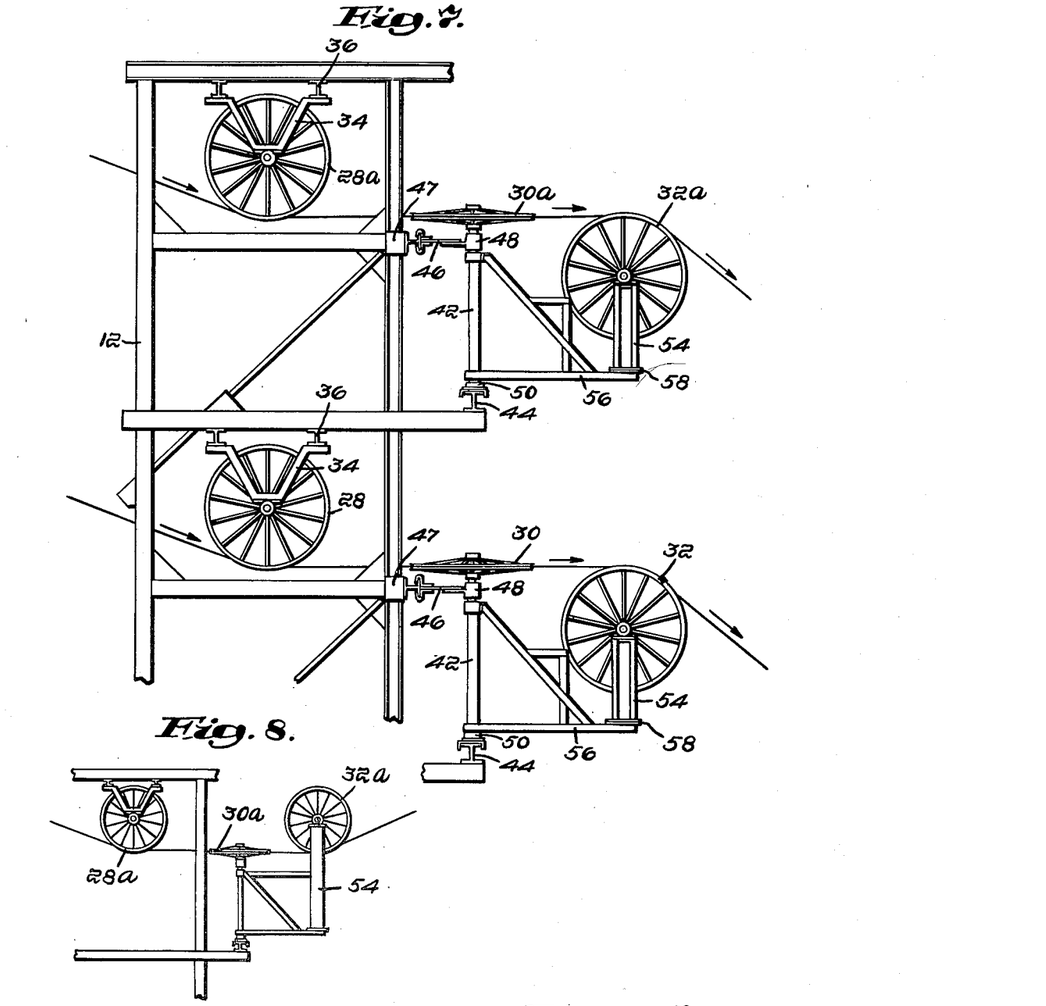
Fig. 7 is a fragmentary elevational view of a wire supporting tower in which is mounted the sheave mechanism illustrated in Figs. 3 and 4.
Fig. 8 is a side elevational view of a sheave arrangement for leading a downwardly moving wire away along a new path in an upward direction.
Figure 14:
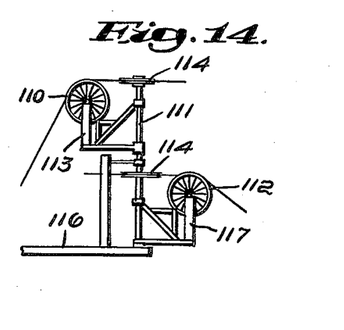
Figs. 14 and 15 illustrate modified sheave supporting structures.
Figure 15:
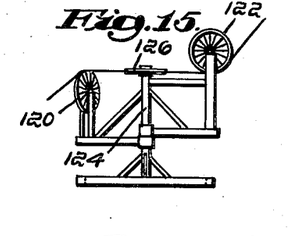

In the use of an orienting sheave assembly such as described, it may be desired to resort to modifications of the structure such as for example those shown in Figs. 8, 14 and 15. Thus I may desire to construct a hinged sheave of the character noted in Fig. 8 in which the member 54 is of increased height so as to support the sheave 32a in a raised position which may be desirable under some operating conditions. Similarly I may provide for a double hinge arrangement as suggested in Fig. 14 in which sheave 110 is mounted on a bracket 113 pivotally mounted on an upright 111. Directly below is a second bracket 117 independently pivoted on upright 111. Intermediate sheaves 114 are utilized with each of these units and there is thus afforded a wider range of operation. Still another arrangement may consist of two hinged sheaves 120 and 122 mounted about a common upright 124 and having a common intermediate sheave 126 as shown in Fig. 15. It will also be noted that the arrangement shown in Fig. 8 is illustrative of an assembly of sheaves such that the lead-in and lead-out sheaves are not disposed at different levels but lie in approximately the same horizontal position. In this arrangement sheave 122 may be located above sheave 126. Various other supporting structures may be employed to combine these sheaves in the desired relative position which is an essential part of the invention.

Having thus disclosed my invention and described in detail illustrative embodiments thereof, I claim as new and desire to secure by Letters Patent:

1. A wire sawing apparatus for use in quarrying, comprising a wire member, means for urging the wire into sliding contact with the surface to be sawn, means for furnishing wire to the sawing means, a guide assembly for the wire located between the sawing means and the wire furnishing means for directing the path of movement of the wire in varying directions, said guide assembly including a supporting structure, a lead-in sheave, a lead-out sheave, and an intermediate sheave, said supporting structure including a vertical frame and longitudinally extending guide rails carried thereby, a vertical post member terminating at its upper end portion in a vertical bearing for supporting in a horizontal plane one of said sheaves, the lower portion of said upright post member being mounted on one of said horizontal rails for sliding adjustment therealong, means for securing said post in its adjusted position on said rail, a bracket member including an arm having one end portion provided with a collar rotatable about said post, a rotatable sheave mounting for a lead-out sheave on the outer end of said bracket arm, means for securing said sheave mounting in adjusted position, a sheave bearing at the upper end of said mounting with its axis in a horizontal plane, an angular brace member connecting the outer end of said bracket arm with the upper portion of said post, a third sheave support carried by said supporting frame, said third sheave support including a horizontal supporting bearing for supporting a sheave in a vertical plane, said support being adjustable for rotating the sheave bearing in its own horizontal plane, and said last-named support being adjustable longitudinally of said supporting rails.

2. A wire sawing apparatus for use in quarrying, comprising a wire member, means for urging the wire into sliding contact with the surface to be sawn, means for furnishing wire to the sawing means, a guide assembly for the wire located between the sawing means and the wire furnishing means for directing the path of movement of the wire in varying directions, said guide assembly including a supporting structure, a lead-in sheave, a lead-out sheave, and an intermediate sheave, said sheaves being formed with peripheral grooves for said wire member, and said supporting structure including a vertical frame and longitudinally extending guide rails carried thereby, a sheave mounting for the lead-in sheave, said sheave mounting including arms adjustably secured on certain of said rails, said mounting permitting rotational movement of said sheave about its axis and longitudinal movement along its supporting rails, a vertical sheave support for the intermediate sheave, said vertical sheave support including a post mounted at its lower end portion on another of said rails, a collar about the upper end of said post, means for securing said collar to another of said rails and a vertical bearing at the upper end of the post for supporting the intermediate sheave in horizontal position, a swinging bracket mounted on said post for rotational movement about the axis of said post, said swinging bracket including an arm extending laterally of said rails, and a vertical sheave supporting frame at the end portion of said bracket for the lead-out sheave, said sheave supporting frame including upright members and a rotary supporting plate for said upright members, means for securing said plate in adjusted position, and horizontal sheave bearings at the upper ends of said sheave supporting frame for supporting said lead-out sheave, said sheaves being of such dimension that the grooves in their peripheries are constantly in alignment to guide the wire in centered relation.

3. A wire sawing apparatus for use in quarrying, comprising a wire member, means for urging the wire into sliding contact with the surface to be sawn, means for furnishing wire to the sawing means, a guide assembly for the wire located between the sawing means and the wire furnishing means for directing the path of movement of the wire in varying directions, said guide assembly including a supporting structure, a lead-in sheave, a lead-out sheave, and an intermediate sheave, said supporting structure including a vertical frame, and longitudinally extending guide rails carried thereby, a sheave mounting longitudinally adjustable on certain of said guide rails, means for angularly adjusting said mounting in a horizontal plane, and a lead-in sheave supported thereby, a vertical sheave support positioned laterally of the main frame and movable on other of said guide rails laterally with respect to the first sheave mounting and in a plane parallel to the plane of movement of the first sheave support, an intermediate sheave carried at the upper end portion of said sheave support, and a sheave supporting structure for the lead-out sheave, said sheave supporting structure for the lead-out sheave including a swinging bracket and a rotatably adjustable upright support, said bracket being pivotally supported on said frame for swinging movement about the axis of the intermediate sheave, and a bearing at the upper end portion of the upright frame for supporting the lead-out sheave.

HARRY E. STRATTON.

REFERENCES CITED

The following references are of record in the file of this patent:

UNITED STATES PATENTS

| Number | Name | Date |
| --- | --- | --- |
| 594,542 | Knobel | Nov. 30, 1897 |
| 884,949 | Owens | Apr. 14, 1908 |
| 1,155,146 | Lespagnol | Sept. 28, 1915 |
| 1,662,488 | Burkhardt | Mar. 13, 1928 |
| 2,019,386 | Benedini | Oct. 29, 1935 |

FOREIGN PATENTS

| Number | Country | Date |
| --- | --- | --- |
| 667 | Italy | July 23, 1881 |
| 11,114 | Switzerland | Sept. 16, 1895 |
| 98,977 | Germany | May 15, 1897 |
| 105,379 | Germany | Oct. 28, 1897 |
| 395,568 | France | Mar. 9, 1909 |
| 422,808 | Germany | May 27, 1923 |
| 545,325 | France | Oct. 10, 1922 |
| 550,084 | France | Dec. 6, 1922 |
| 560,977 | France | July 24, 1923 |
| 562,310 | France | Nov. 8, 1923 |
| 596,906 | France | Nov. 4, 1925 |
| 638,027 | France | Feb. 13, 1928 |
| 735,820 | France | Sept. 6, 1932 |